(12) United States Patent
Rodriguez et al.

(10) Patent No.: US 8,340,853 B2
(45) Date of Patent: Dec. 25, 2012

(54) SYSTEM AND METHOD FOR INDICATING APPARENT VEHICLE SERVICE BRAKE APPLICATION WITHOUT APPARENT OPERATION OF SERVICE BRACK ACTUATOR

(75) Inventors: Rogelio Rodriguez, Plainfield, IL (US); Ly V. Tran, Carol Stream, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 722 days.

(21) Appl. No.: 12/497,201

(22) Filed: Jul. 2, 2009

(65) Prior Publication Data

US 2010/0145565 A1   Jun. 10, 2010

Related U.S. Application Data

(60) Provisional application No. 61/078,130, filed on Jul. 3, 2008.

(51) Int. Cl.
*G06F 19/00* (2006.01)
(52) U.S. Cl. ............ 701/29; 303/122.03; 303/122.04; 303/122.05; 701/36; 701/70; 701/29.1; 701/29.7; 701/30.4; 701/30.9; 701/31.1; 701/31.8
(58) Field of Classification Search ............ None
See application file for complete search history.

(56) References Cited

U.S. PATENT DOCUMENTS

| | | | | |
|---|---|---|---|---|
| 5,615,930 A * | 4/1997 | McGrath et al. | ................ | 303/7 |
| 5,825,287 A * | 10/1998 | Zarybnicky et al. | ......... | 340/453 |
| 5,911,483 A * | 6/1999 | Overhulser | ...................... | 303/7 |
| 6,068,352 A * | 5/2000 | Kulkarni et al. | ............... | 303/20 |
| 6,188,948 B1 | 2/2001 | Shivler, Jr. | | |
| 6,301,541 B1 * | 10/2001 | Hosomi et al. | ................. | 701/89 |
| 6,352,137 B1 * | 3/2002 | Stegall et al. | ........... | 188/1.11 L |
| 6,412,885 B1 * | 7/2002 | Shirai et al. | ............ | 303/122.09 |
| 6,417,768 B2 * | 7/2002 | Osterman et al. | ............ | 340/479 |
| 6,428,117 B1 * | 8/2002 | Messersmith | .................... | 303/3 |
| 2002/0123837 A1 * | 9/2002 | Eccleston et al. | .............. | 701/70 |
| 2003/0222774 A1 * | 12/2003 | Koenigsberg et al. | ........ | 340/453 |
| 2004/0243290 A1 * | 12/2004 | Schmidt et al. | ................ | 701/34 |
| 2005/0006952 A1 * | 1/2005 | Kohler et al. | ................ | 303/124 |
| 2005/0146212 A1 * | 7/2005 | Cannon | ........................ | 303/123 |
| 2005/0225169 A1 * | 10/2005 | Skinner et al. | ................ | 303/123 |
| 2006/0043790 A1 * | 3/2006 | Spieker | ........................ | 303/122 |
| 2006/0076827 A1 * | 4/2006 | Albright et al. | ................ | 303/123 |
| 2006/0290202 A1 * | 12/2006 | Shibata et al. | ................ | 303/165 |
| 2007/0078042 A1 * | 4/2007 | Yoneyama | ...................... | 477/125 |
| 2007/0129214 A1 * | 6/2007 | Kondo et al. | ................ | 477/144 |
| 2007/0222283 A1 * | 9/2007 | Skinner et al. | ................ | 303/20 |
| 2007/0232432 A1 * | 10/2007 | Yoneyama | ................... | 475/119 |
| 2008/0227598 A1 * | 9/2008 | Sigmund | ........................ | 477/92 |
| 2008/0246335 A1 * | 10/2008 | Spieker et al. | ........... | 303/122.08 |

* cited by examiner

*Primary Examiner* — Jonathan M Dager
(74) *Attorney, Agent, or Firm* — Mark C. Bach; Jeffrey P. Calfa

(57) ABSTRACT

A motor vehicle has wheels on which it travels, a powertrain delivering propulsion torque to at least some of the wheels propel the vehicle, and a service brake system having service brakes. When the service brakes are applied by a service brake actuator, braking torque is applied to at least some wheels. A first device provides data representing a velocity that correlates with velocity of the vehicle, and a second device associated with the actuator provides data that distinguishes between application and non-application of the service brakes by the actuator. A processor monitors data from the first and second devices and processes the monitored data to provide a data output when the first device has disclosed velocity change indicative of the service brakes having been applied without the second device having disclosed that the service brakes have been applied.

7 Claims, 2 Drawing Sheets

SYSTEM AND METHOD FOR INDICATING APPARENT VEHICLE SERVICE BRAKE APPLICATION WITHOUT APPARENT OPERATION OF SERVICE BRACK ACTUATOR

REFERENCE TO RELATED APPLICATION AND PRIORITY CLAIM

This application claims the priority of Provisional Patent Application No. 61/078,130, filed on 3 Jul. 2008, the entire content of which is incorporated herein by reference.

TECHNICAL FIELD

Motor vehicles have service brakes that when applied by operation of a service brake actuator, decelerate the vehicle by applying braking torque to one or more components associated with one or more wheels on which the vehicle travels. More particularly, a strategy is embodied in a processor that monitors and processes data concerning certain operations in a vehicle, and a method indicates apparent application of a vehicle's service brakes without a corresponding indication of the service brake actuator having been operated.

BACKGROUND

Various systems and components in a motor vehicle have self-diagnostic capabilities that are useful for identifying and flagging certain events that may deserve subsequent investigation of one or more systems and/or components in order to ascertain if some sort of corrective action may be needed. Occurrence of certain events while a vehicle is in operation may call for more immediate action such as disabling certain accessory systems and/or devices whose operation may be affected by a particular event.

A vehicle's service brake system typically comprises a foot pedal that when depressed by a driver of the vehicle operates service brakes at the vehicle's wheels. A hydraulic brake system is one known type of service brake system. When a driver applies the service brakes, a device, such as a switch, is operated. Operation of the switch typically illuminates the vehicle's stop lamps, but its operation may be a signal that is of interest to other systems and/or devices in the vehicle itself or in a vehicle being towed.

Examples of such switches are electrical pressure switches that are operated by hydraulic fluid pressure when a master cylinder of a hydraulic brake system is operated by a driver depressing the foot pedal, and mechanically-operated electrical switches that are operated by depression of a switch plunger caused by motion of the foot pedal when depressed by the driver.

SUMMARY

An on-board diagnostic flags an event indicative of a possible fault in such a switch and/or in circuitry that connects the switch into the vehicle's electrical system. A possible fault can be promptly signaled and may be used to disable vehicle systems such as cruise control, PTO (power take-off) control, etc., until the possible fault can be investigated.

This diagnostic capability is embodied in a software strategy in a processor and uses input data that may be already available in a vehicle so that no additional input devices need be added to such a vehicle.

A motor vehicle comprises wheels on which the vehicle travels, a powertrain delivering propulsion torque to at least some of the wheels to propel the vehicle, a service brake system comprising service brakes that when applied by a service brake actuator are effective to impart braking torque to at least some of the wheels, an electrical system, a first device providing velocity data representing a velocity that correlates with rotational velocity of a wheel, and a second device associated with the service brake actuator providing data that distinguishes between application and non-application of the service brakes by the service brake actuator.

A processor operates i) to differentiate velocity data provided by the first device to produce deceleration data, ii) to compare the deceleration data with a deceleration threshold value which demarcates deceleration large enough to indicate application of the service brakes from smaller decelerations which do not indicate application of the service brakes, and iii) to signal a fault in at least one of the second device and circuitry connecting the second device to the electrical system when comparison of the deceleration data with the deceleration threshold value indicates application of the service brakes while the second device is disclosing that the service brakes are not being applied.

The foregoing summary, accompanied by further detail of the disclosure, will be presented in the Detailed Description below with reference to the following drawings that are part of this disclosure.

DETAILED DESCRIPTION

Figure 1:
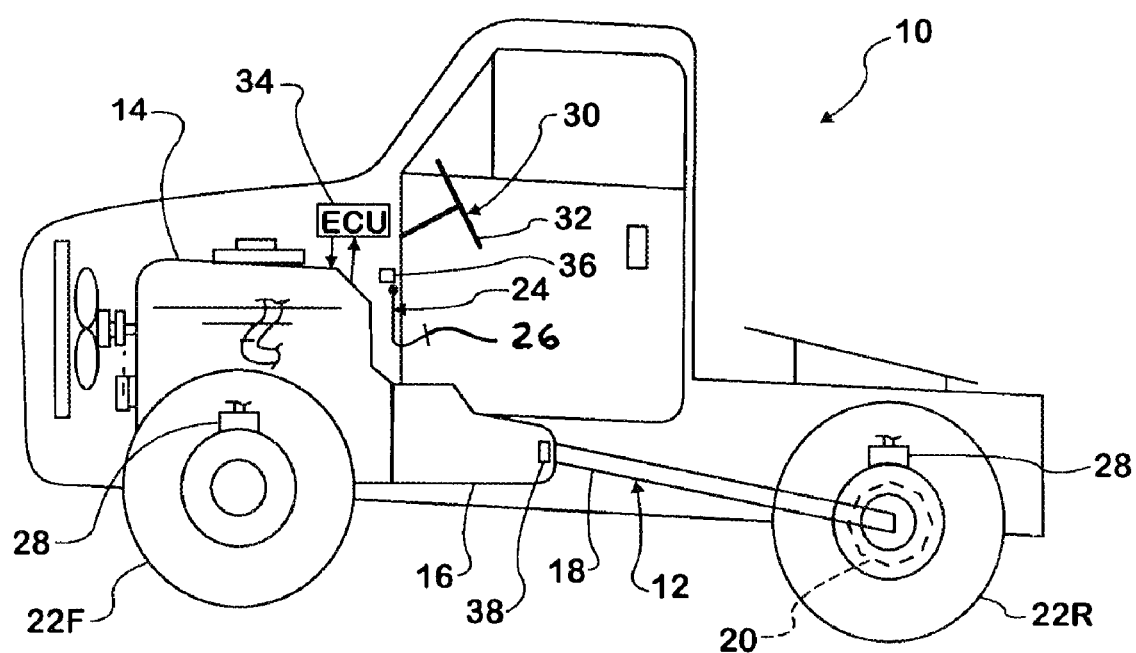
FIG. 1 is a schematic side elevation view of a motor vehicle showing elements relevant to the present disclosure.

FIG. 1 shows a motor vehicle, an example of which is a truck 10 having a powertrain 12 that includes in succession an internal combustion engine, such as a diesel engine 14, a transmission 16, a driveshaft 18 and a rear axle 20 at right and left ends of which are mounted right and left rear wheels 22R. Rear wheels 22R are driven wheels to which powertrain 12 delivers propulsion torque created by engine 14 to turn the driven wheels and propel the truck. Axle 20 includes a differential mechanism to which driveshaft 18 is an input and from which right and left axle shafts extend to the respective rear wheels.

Truck 10 also has right and left front wheels 22F and a service brake system 24 that includes as an actuator, a foot pedal 26 that when depressed by a driver's foot, applies service brakes 28 at each of the wheels. Examples of wheel service brakes are drum-type and disc-type friction brakes. Front wheels 22F are steered wheels that a steering system 30 turns via a steering wheel 32 to steer the truck.

A processor-based engine control unit (ECU) 34 processes data from various sources to develop and provide various data for various purposes, including various control data for controlling various aspects of engine operation. The data may be published on one or more data busses in the truck where it can be read by ECU 34 or supplied as general inputs to the ECU.

Two sources of data that are available to ECU 34 originate at a first device 36 and a second device 38. Device 36 is one that detects depression of foot pedal 26 indicative of the driver applying the service brakes to brake wheels 22R and 22F. Device 38 is one that measures rotation of a rotary member in the powertrain to provide data disclosing rotation of the rotary member. FIG. 1 shows device 38 associated with a rotary output member of transmission 16 that is directly coupled to driveshaft 18.

Device 36 comprises an electrical switch that is typically present in O.E.M. vehicles and associated with brake system 24 so as to be operated as a consequence of depression of a foot pedal 26 by a driver when the driver applies service brakes 28. Depending on the nature of the specific brake pedal mechanism, the switch may be a plunger-operated mechanical switch whose plunger is either released or depressed when the driver depresses pedal 26. The switch may also be a pressure switch connected for operation by pressure increase in a hydraulic brake system.

Figure 2:
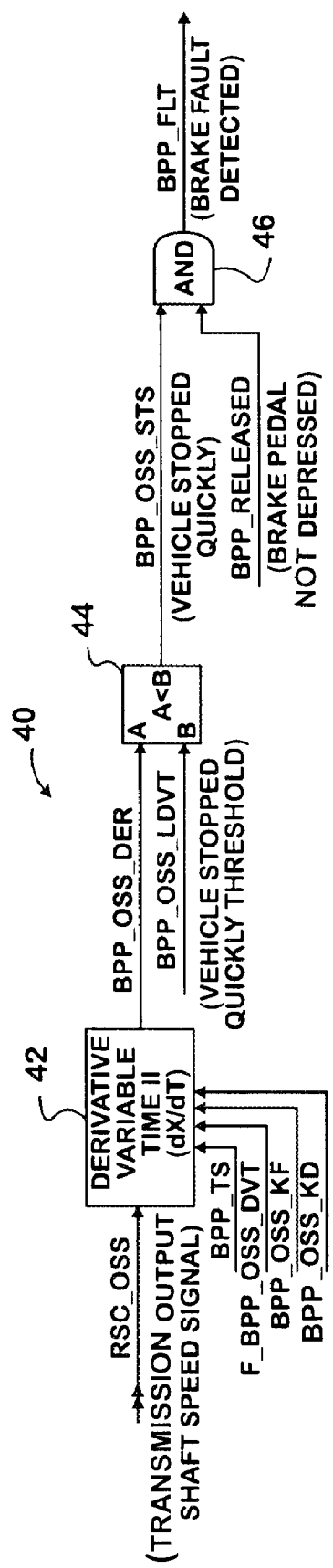
FIG. 2 is a diagram of a portion of an exemplary embodiment of software strategy in a processor in the vehicle.

FIG. 2 shows a strategy diagram 40 representing an algorithm embodied in software in the processor of ECU 34. Device 38 provides data for a parameter RSC_OSS that is processed by a step 42 along with data for other parameters BPP_TS, F_BPP_OSS_DVT, BPP_OSS_KF, and BPP_OSS_KD.

Parameter RSC_OSS represents the rotational velocity of the output member of transmission 16. The algorithm that is executed by step 42 mathematically differentiates that velocity to produce a value for a parameter BPP_OSS_DER representing the acceleration/deceleration of the transmission output member. Because this member is mechanically coupled with the rear wheels, it rotates at a velocity correlated with the rear wheel velocity.

When a driver steps on pedal 26 to apply brakes 28, brake system 24 causes brakes 28 to apply braking torque to wheels 22R, 22F to decelerate the vehicle. Because of the mechanical coupling of the transmission output member with the rear wheels, deceleration of the latter also decelerates the transmission output member.

A positive data value for BPP_OSS_DER indicates acceleration while deceleration is indicated by a negative value. The more negative the value, the greater the deceleration.

Parameter BPP_OSS_DER is a data input to a comparison function 44 that functions to compare the value for BPP_OSS_DER with a deceleration threshold value represented by a parameter BPP_OSS_LDVT. When the value for BPP_OSS_DER is more negative than the value for BPP_OSS_LDVT, the output of function 44, identified by a parameter BPP_OSS_STS, switches from a logic "0" to a logic "1".

The value for parameter BPP_OSS_LDVT demarcates a deceleration large enough to indicate application of service brakes 28 by the driver from smaller decelerations not so indicative.

Parameter BPP_OSS_STS is one input to an AND logic function 46. A second input to function 46 is a parameter BPP_RELEASED. The value of the latter parameter is determined by the switch of device 36.

When device 36 indicates that pedal 26 is not being depressed, parameter BPP_RELEASED has a logic value "1". When device 36 indicates that pedal 26 is being depressed, parameter BPP_RELEASED has a logic value "0".

Consequently when device 36 discloses that pedal 26 is being depressed, the output of function 46 represented by a parameter BPP_FLT is forced to a logic value "0".

However, when device 36 is disclosing that pedal 26 is apparently not being depressed, while the output of function 44 is disclosing that service brakes 28 are apparently being applied, both inputs to function 46 have logic values "1", causing parameter BPP_FLT to have a logic value "1". When that happens, a fault in device 36 and/or circuitry connecting it to the electrical system is flagged.

Occurrence of such an event may be immediately signaled in any suitable manner and/or cause certain systems and/or devices, such as ones mentioned earlier, to be disabled until the indicated fault can be investigated and any appropriate corrective action taken.

What is claimed is:

1. A motor vehicle comprising:
   wheels on which the vehicle travels;
   a powertrain delivering propulsion torque to at least some of the wheels to propel the vehicle;
   a service brake system comprising service brakes that when applied by a service brake actuator are effective to impart braking torque to at least some of the wheels;
   an electrical system;
   a first device providing velocity data representing a velocity that correlates with rotational velocity of a wheel;
   a second device associated with the service brake actuator providing data that distinguishes between application and non-application of the service brakes by the service brake actuator;
   and a processor which operates i) to differentiate velocity data provided by the first device to produce deceleration data, ii) to compare the deceleration data with a deceleration threshold value which demarcates deceleration large enough to indicate application of the service brakes from smaller decelerations which do not indicate application of the service brakes, and iii) to signal a fault in at least one of the second device and circuitry connecting the second device to the electrical system when comparison of the deceleration data with the deceleration threshold value indicates application of the service brakes while the second device is disclosing that the service brakes are not being applied.

2. A motor vehicle as set forth in claim 1 in which the first device is disposed in association with a rotary member in the powertrain to provide data disclosing velocity of the rotary member.

3. A motor vehicle as set forth in claim 2 in which the rotary member is disposed on a transmission in the powertrain to provide data disclosing velocity of an output member of the transmission through which torque is delivered to right and left wheels of the vehicle.

4. A motor vehicle as set forth in claim 3 in which the right and left wheels are coupled to the transmission output member through a differential mechanism of an axle in the powertrain.

5. A motor vehicle as set forth in claim 4 in which the powertrain comprises a driveshaft through which torque is delivered from the transmission output member to the differential mechanism of the axle.

6. A motor vehicle as set forth in claim 1 in which the second device comprises an electrical switch that is operated as a consequence of depression of a foot pedal by a driver of the vehicle to apply the service brakes.

7. A motor vehicle as set forth in claim 1 in which the second device comprises a mechanically-operated electrical switch having a plunger that is operated as a consequence of depression of a foot pedal by a driver of the vehicle to apply the service brakes.

* * * * *